United States Patent
Moon et al.

(10) Patent No.: US 6,173,297 B1
(45) Date of Patent: Jan. 9, 2001

(54) DYNAMIC OBJECT LINKING INTERFACE

(75) Inventors: Billy G. Moon, Apex; Brian Bankler, Cary, both of NC (US)

(73) Assignee: Ericsson Inc., Research Triangle Park, NC (US)

(*) Notice: Under 35 U.S.C. 154(b), the term of this patent shall be extended for 0 days.

(21) Appl. No.: 08/938,012

(22) Filed: Sep. 12, 1997

(51) Int. Cl.[7] .............................. G06F 15/00; G06T 17/00
(52) U.S. Cl. .......................... 707/515; 345/302; 345/433
(58) Field of Search .................................. 707/515, 516, 707/103, 540, 517; 345/433, 326, 329, 335, 333, 339; 395/705, 683

(56) References Cited

U.S. PATENT DOCUMENTS

| | | | |
|---|---|---|---|
| 5,680,619 | * 10/1997 | Gudmundson et al. | 395/701 |
| 5,734,905 | * 3/1998 | Oppenheim | 395/683 |
| 5,872,973 | * 2/1999 | Mitchell et al. | 395/685 |
| 5,935,210 | * 8/1999 | Stark | 709/224 |
| 5,937,409 | * 8/1999 | Wetherbee | 707/103 |
| 5,946,699 | * 8/1999 | Sawashima et al. | 707/203 |

* cited by examiner

*Primary Examiner*—Joseph H. Feild
*Assistant Examiner*—Alford W. Kindred
(74) *Attorney, Agent, or Firm*—Coats & Bennett, PLLC

(57) ABSTRACT

An object-linking interface for a computer system dynamically links a selected target object within an host application with a second user application. The operating environment includes a plurality of means testers, each of which is associated with a specific user application, and an object mapper. The means tester is passed a copy of the target object and tests the suitability of the associated application for processing the target object and generates a corresponding likelihood score. The object mapper queries each means tester to obtain the likelihood score and identifies, based upon said likelihood score, one or more applications suitable for processing the target object. The object mapper may automatically launch the recruited application or may allow the user to select a recruited application from among a list of candidates. The target object is then passed to the recruited application for processing.

16 Claims, 4 Drawing Sheets

DYNAMIC OBJECT LINKING INTERFACE

FIELD OF THE INVENTION

The present invention relates to a computer software integration and more particularly to a method of sharing and manipulating software objects between a number of different, independent software applications.

BACKGROUND OF THE INVENTION

In the computer industry today, software applications exist which service a wide variety of user needs. Individual applications are typically optimized so as to excel in a particular functional area, while offering sub-optimal or minimal performance in other functional areas. For example, spreadsheet applications are typically adept at producing data tables and graphs of the data in these tables, but perform rather poorly when called upon to produce an intricately formatted text document. On the other hand, word processing applications tend to handle the production of highly formatted text documents with ease, but generally handle data tabulation and graphing functions poorly. Given this strong division of functionally among applications, the typical user often requires some degree of information sharing among the various applications being employed. Application integration strategies allow some degree of information sharing by allowing the user to invoke a single application which, in turn, calls upon associated specialized applications are required. However, the efficient and user-friendly sharing of information between different applications continues to prove a stumbling point for the computer industry as a whole.

In 1992 Microsoft Corp. released a protocol, Object Linking and Embedding (OLE), that enables one application to use the services of other applications through a nearly transparent interface. The OLE protocol allows applications which support the protocol to incorporate objects which contain links to other applications. Objects, as the term is used herein, can include text, charts, graphs, spreadsheet tables, bitmap images, vector drawings, sound bites, video clips, programs, and nearly anything else that can be displayed, controlled, or manipulated by a software application.

In the OLE protocol, the object that contains the linked or embedded objects is referred to as a container object. A container object contains other objects that are still connected to the original application that created them, where the connections can either be a linked connection or an embedded connection. Linked connections are connections where the actual data associated with the contained object resides in another, separate object. In such a case, the information necessary to establish and maintain a linked connection is simply a reference to the contained object. Embedded connections, on the other hand, are connections where the actual data associated with the contained object resides within the container object. In either case, the contained object can only be edited by the application that originally created it.

OLE and OLE-type integration strategies allow the user to focus on the central task at hand, without requiring explicit knowledge or control of the applications needed to accomplish the task. In the case of OLE, the applications required to perform a given task are brought to the user in a preferred format or context, when necessary. Also, files tend to be more compact when the linking-type application integration strategies are employed because linking to an object allows an application data file to reflect information about the linked object without having the object's data physically stored and maintained in the data file.

OLE and OLE-type integration strategies constitute a significant step towards effective integration of a variety of individual software applications. However, these type integration strategies necessarily require that certain data be stored with a linked or embedded object, thus providing the information necessary for tracking the embedded or linked object back to the originating application. More particularly, both embedding and conventional linking create "hard" connections between the linked/embedded object and the application which originally created the object. That is, the connection is to a specific application that does not change. Thus, the linked/embedded object requires a pre-defined connection path to the outside application.

From a user's perspective, it is desirable to have a more flexible arrangement, one where the connection between objects and applications did not need to be pre-defined. Therefore, there exists a need for an application integration method that is capable of efficiently operating when there are no pre-defined connections between an object and any other application defined within the computer operating system.

SUMMARY OF THE INVENTION

The present invention is an object-linking interface for a computer system which dynamically links a selected target object from a host application with a second user application. The dynamic object linking operating environment includes a plurality of means testers, each of which is associated with a specific user application, and an object mapper. The object mapper passes a copy of the target object to each means tester. Each means tester thereafter tests the target object to determine the suitability of the associated application for processing the target object and generates a likelihood score indicating the suitability. The object mapper queries each means tester to obtain its likelihood score and identifies, based upon said likelihood scores, one or more applications suitable for processing the target object. The object mapper may select a recruited application automatically or may suggest a list of candidates for a user to select a recruited application from. The target object is then passed to the recruited application for processing by that application to create a return object. The return object is then passed to the host application to supplant the target object. In this manner, a target object is dynamically linked to an outside application, i.e., the recruited application. The identity of the recruited application will depend on the content of the target object and may vary from one object to another and from time to time.

DETAILED DESCRIPTION OF THE INVENTION

Figure 1:
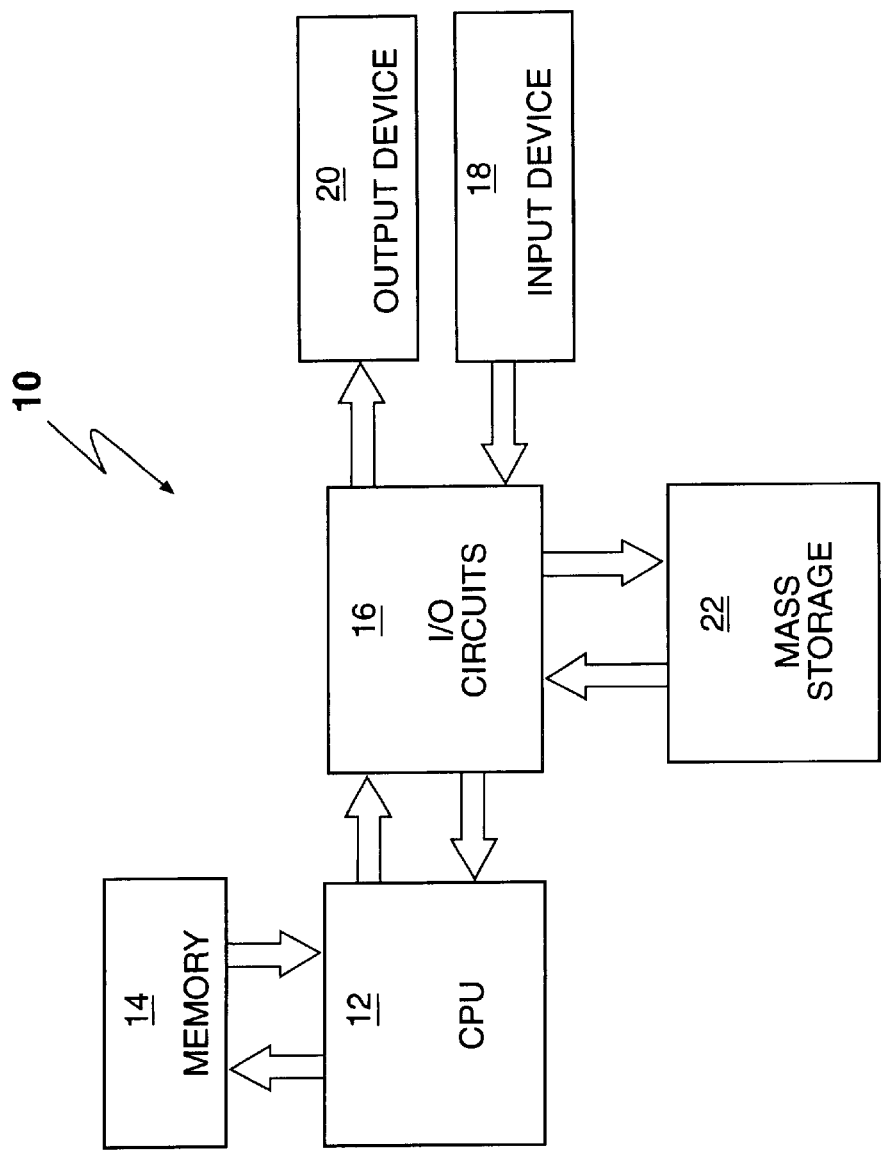
FIG. 1 is a simplified block diagram of a computer system.

FIG. 1 illustrates a computer system 10 which implements the object linking interface of the present invention in simplified block diagram form. The computer system 10 includes a central processing unit 12 which operates according to instructions stored in its memory 14. Input/output (I/O) circuits 16 interface the central processing unit 12 with one or more input devices 18 and output devices 20. The input device 18 may, for example, comprise a keyboard, keypad, infra red transmitter, voice detector, light pen, mouse, touch screen or any other suitable device or devices for inputting commands to a computer. The output device 20 may comprise, for example, a display or other peripheral devices connected through I/O ports contained within the I/O circuits 16. A computer system 10 may also include a mass storage device 22, such as a hard disk drive, a floppy disk drive, a PCMCIA flash drive, or an optical disk drive.

The computer system 10 operates in accordance with programs stored in its memory 14. The programs running on the computer system 10 may be generally characterized as either operating system programs or user application programs. The operating system programs are a set of programs to control and coordinate the operation of hardware and software in a computer system 10. The operating system programs direct the execution of user application programs, supervise the location, storage, and retrieval of data, and allocate resources of the computer system 10 to the various tasks to be performed. User application programs, also known as user applications or simply applications, on the other hand, are programs which are used to perform complex tasks at the direction of users. Examples of user applications include word processing programs, database programs, spreadsheet programs, and personal information managers.

Figure 2:
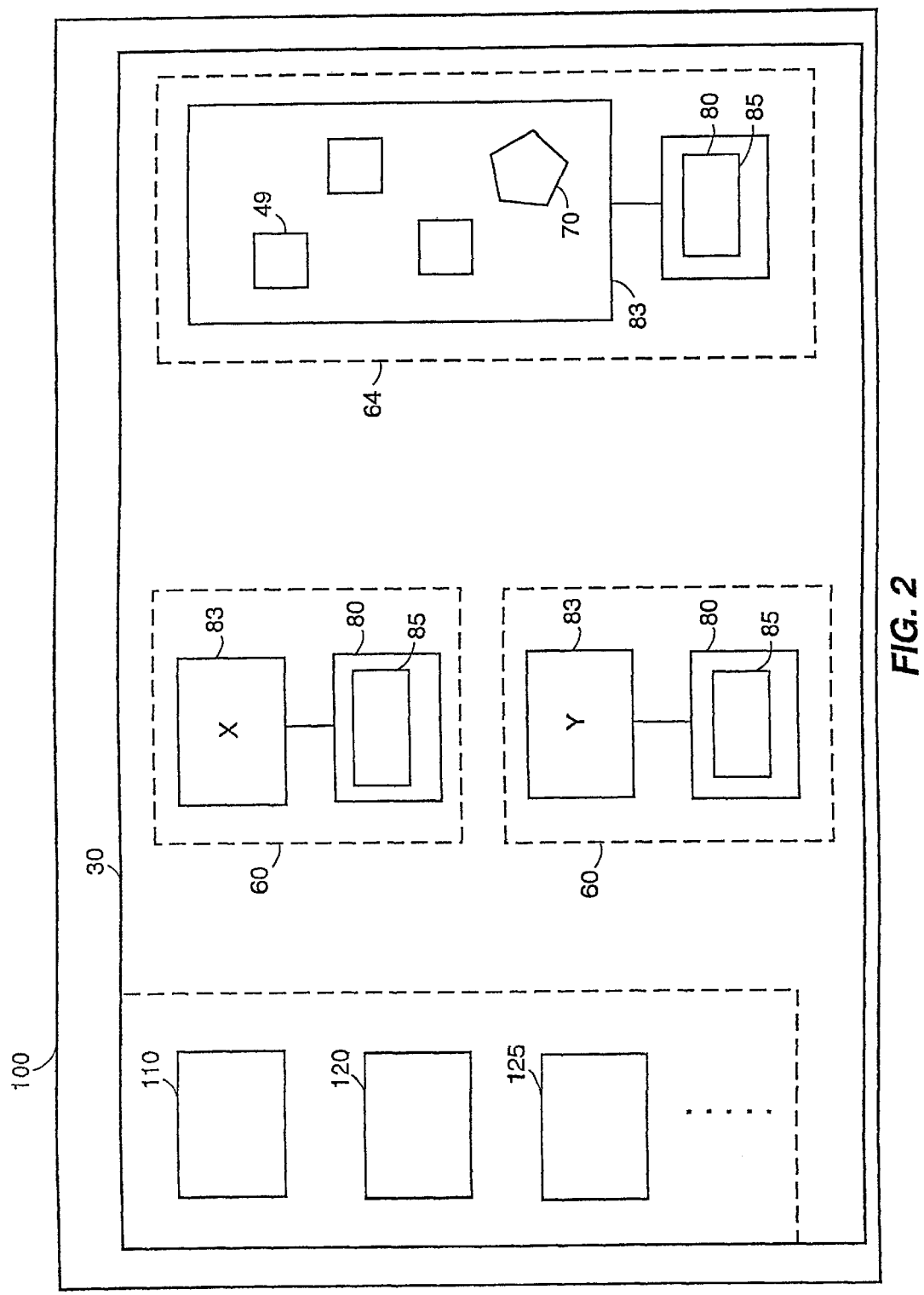
FIG. 2 is a simplified block diagram of an operating system with the component of the dynamic object linking interface of the present invention.

A set of interfacing instructions, including operating system programs, act as the lowest level of interface between the hardware and software which together comprise the computer system 10. These interfacing instructions are collectively known as an operating system 100. DOS, UNIX, and OS-9 are all examples of commonly encountered operating systems 100 implemented on typical commercially available computer systems 10. FIG. 2 shows an operating system 100. One operating system 100 suitable for the present invention is the OS-9000 kernel made by Microware of Des Moines, Iowa.

Users may choose to interact with the computer system 10 directly through, or at the level of, the operating system 100. However, the trend over the past decade has been towards the use of a buffer between the user and the operating system 100, commonly referred to as an operating environment 30. Windows and Windows 95 are common examples of operating environments 30. These environments tend to be graphically oriented, and generally define the look and feel of the user interface.

Figure 3:
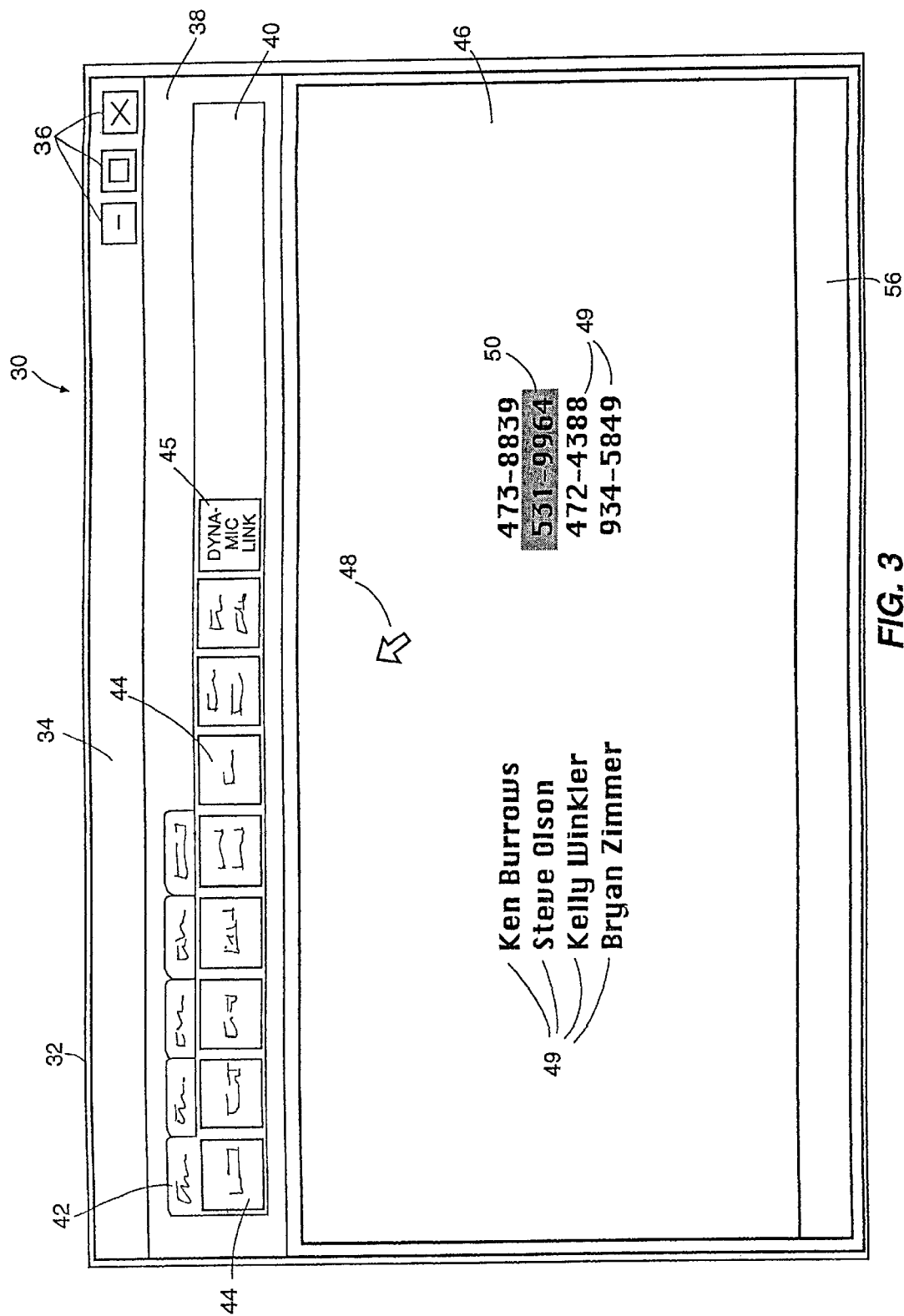
FIG. 3 is a simplified depiction of a operating environment's graphic user interface.

Referring now to FIG. 3, the displayed portion of an operating environment 30 of a user application running on the computer system 10 is shown. The user application illustrated in FIG. 3 is a word processing application. It is to be understood, however, that the present invention can be used with virtually any type of user application and is not limited to word processing applications. The operating environment 30 is displayed to the user on the screen of the computer display output device 20.

The operating environment 30 includes a window 32 having a title bar 34 across the top of the window 32. Title bar buttons 36 are disposed on the right hand of the title bar 34. These buttons 36 are used to close, maximize and minimize the window 32. Buttons 36 are activated using the "point and click" mouse method. These buttons will be familiar to users of the Windows 95 and Windows NT operating systems. A status bar 56 where messages or icons are displayed for the user extends across the bottom of the window 32.

Below the title bar 34 is the menu bar 38. The menu bar 38 includes a tab strip 40 with a series of tabs 42. Menu buttons 44 are placed on the tab strip 40. One menu button 44 of particular relevance to the discussion of the present invention is the dynamic linking control menu button 45. Different sets of menu buttons 44 can be selected by "clicking" on the tabs 42 with the mouse. It should be understood that there are numerous methods well known in the art that are equivalent to clicking with a mouse for selecting an option or an object such as using a touch screen, a remote pointer, or a voice command; all of these methods are encompassed by the term clicking with a mouse. Menu buttons 44 are also selected by "clicking" the menu button 44 with the mouse.

The area below the menu bar 38 is the work area 46 where the object being manipulated by a user application is displayed to the user. The cursor 48, which is moved by the mouse, is shown in the work area 46. Various application objects 49 are contained within the work area 46, including objects actively being manipulated, such as a selected object 50.

It should be noted that the operating environment 30 described above is merely indicative of one specific example of an operating environment 30 which can be implemented with the dynamic object linking system of the present invention. Any number of operating environments 30 could be constructed and implemented with the dynamic object linking system of the present invention which would allow the user to interact with the computer system 10.

In recent years, there has been much interest in linking application objects 49 which have been created by one user application program with other user application programs. An application object 49 is any object that is created and/or manipulated by a user application. For example, in a word processing program, an application object 49 may consist of an entire document, a page of a document, a paragraph of a document, a single word in a document, or a single letter in a document. In a graphics program, an application object 49 may consist of an entire drawing, or of specific shapes or lines in the drawings. In a database program, the application object 49 may consist of a table, query, form, or report. This listing of application objects 49 is by no means exhaustive.

As discussed above, it is desirable to link an application object 49 created by one user application to a second user application. For example, it may be desirable to link an image which resides in a word processing document to an application capable of manipulating graphics objects. Currently, one approach to handling this problem involves using an object linking and embedding (OLE) protocol. OLE provides a protocol through which applications may communicate and exchange information about linked or embedded objects. OLE, however, requires that explicit pre-defined links be maintained between a linked or embedded object and the application which created that object.

The present invention allows an application object 49 within one user application to be dynamically associated with other user applications without the need to maintain explicit links between the object and the other applications. This process is called dynamic object linking, and the interface associated therewith is called a dynamic object linking interface. For ease of reference, the application where the object in question resides will be called the host application 64. The other application to which the object is dynamically associated will be called the recruited application 68. The application object 49 from the host application 64 which is to be dynamically linked will be referred to as the target object 70.

The computer system 10 of the present invention incorporates an object mapper 120 to identify those applications available on the computer which are most likely to be suitable for manipulating the target object 70. Each application which is registered with the object mapper 120 has associated with it a means tester 85 which determines the suitability of the associated application for processing the target object 70. When queried by the object mapper 120, each means tester 85 returns a score to the object mapper 120, herein referred to as a "likelihood score," which is indicative of the associated application's suitability for processing the target object 70. The target mapping controller analyzes the likelihood scores provided by the means testers 85 and selects a recruited application 68 based on the likelihood scores. Typically, the recruited application 68 is the application associated with the highest likelihood score indicating that it is the most suitable for handling the target object 70. Alternatively, a list of candidate recruited applications 68 can be provided for the user to select from, preferably with an indication of their associated likelihood scores.

Referring to FIG. 2, the software components comprising the dynamic object linking interface of the present invention include the operating system 100, the operating environment 30, and a plurality of user application programs 60. Associated specifically with the operating environment 30 are an object mapper 120, an application wrapper registration vector 125, and a dynamic linking control 110. Also shown in FIG. 2 is a host application 64 which contains a number of application objects 49, including a target object 70. Selection of the target object 70 can be accomplished using any number of means well known in the art, for example, a double mouse click.

Residing within the operating environment 30 are a number of applications, generally indicated by the numeral 60. Each application 60 includes a main application program object 83, and a separate application wrapper object 80. The main application program 83 contains the coded information and data necessary for the application 60 to perform the tasks for which it was designed. This coded information and data associated with the main application program 83 is typically not loaded into system memory 14 and activated until the user either directly or indirectly requests the application 60. For example, in a typical Graphical User Interface-type environment, a deactivated application 60 would appear as a small icon on the video display screen. To request or initiate a particular application 60, the user would simply double click on the desired icon using a mouse-type pointing device. Once double clicked, the associated main application program 83 would be loaded into system memory 14 for execution.

Figure 4:
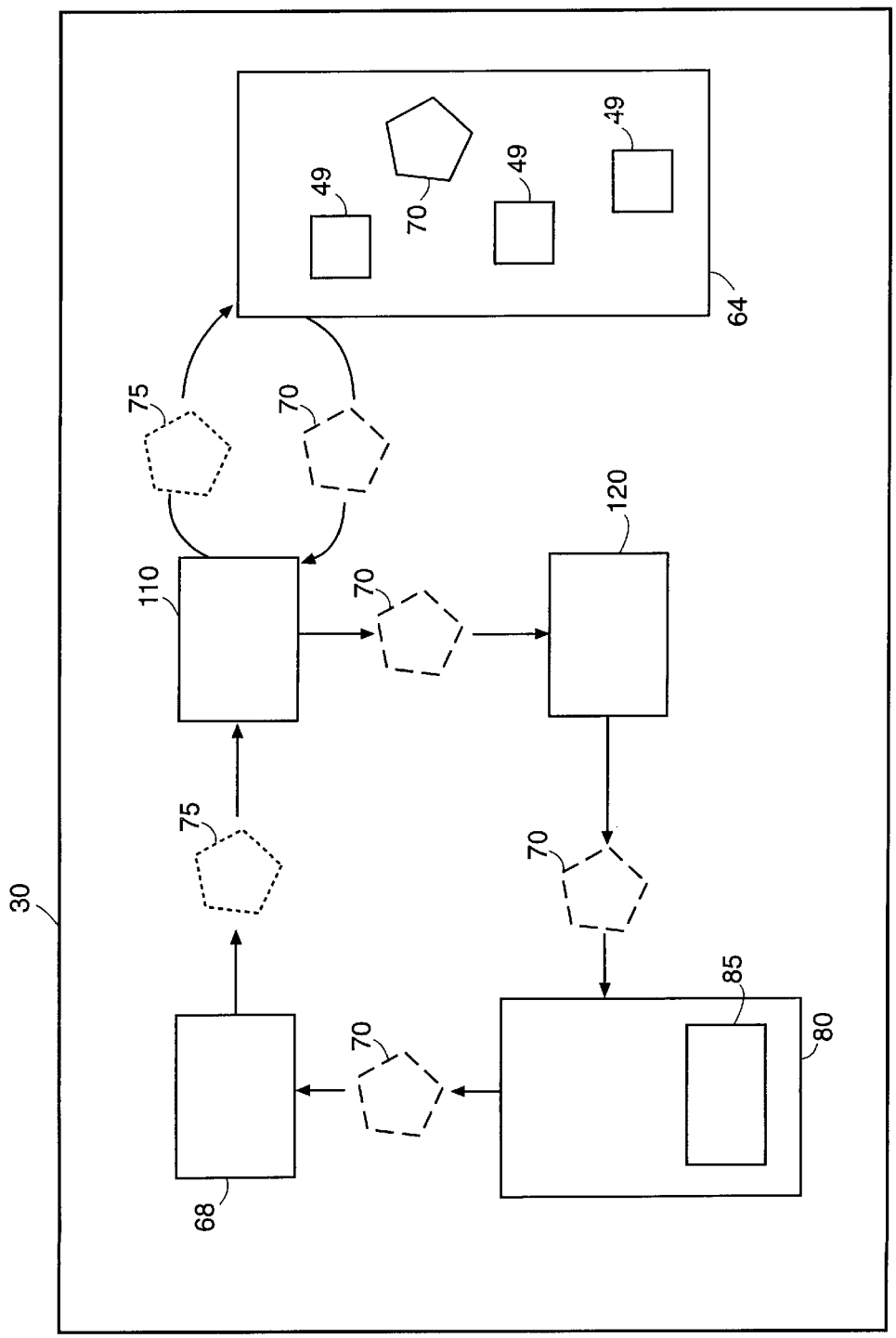
FIG. 4 is a basic flow diagram of one embodiment of the present invention.

The application wrapper 80 functions as an interface between the operating environment 30 and the main application program 83 with which it is associated. The application wrapper 80 can be thought of as a precursor to the main application program 83 with which it is associated. The application wrapper 80 loads and runs in the background when the operating environment 30 is booted. As shown in FIG. 4, the application wrapper 80 communicates with both its associated main application program 83 and the object mapper 120.

Furthermore, as shown in FIG. 4, the application wrapper 80 preferably includes a means tester 85. The means tester 85 contains information relevant to determining the likelihood that the application 60 with which the application wrapper 80 is associated can effectively process any given target object 70.

An application 60 is considered to be "registered" when the means tester 85 associated with the application wrapper 80 has been identified and acknowledged by the object mapper 120. This registration process is typically performed at the time of application installation or setup, at which time the application wrapper 80 associated with the new application 60 queries the system to find the object mapper 120 and serve notice of its presence. In response, the object mapper 120 adds a reference to the new application wrapper 80 to an application wrapper registration vector 125.

FIG. 4 illustrates the basic flow of data between the various objects that have been defined and reside within the operating environment 30. The configuration shown in FIG. 4 presumes one application 60, the host application 64, to be active and engaged by a user. For purposes of illustration, assume that the host application 64, with which the user is interacting, is a word processor. Contained within the host application 64 are a number of objects, including a target object 70. The target object 70 could be, for example, a seven digit number that is contained within the text document being edited, as shown in FIG. 3.

With the target object 70 selected, the user activates the dynamic linking control 110 by clicking the dynamic linking control menu button 44. Upon activation, the dynamic linking control 110 queries the host application 64 and requests a copy of the target object 70. The host application 64 responds by passing a copy of the target object 70 to the dynamic linking control 110. The dynamic linking control 110 then passes a copy of the target object 70 to the object mapper 120. The object mapper 120 then systematically queries all application wrappers 80 listed in the application wrapper registration vector 125.

As shown in FIG. 4, during the query process, the application wrapper 80 is passed a copy of the target object 70 for evaluation. The means tester 85 associated with the application wrapper 80 uses the copy of the target object 70 to calculate a likelihood score which is indicative of the probability that the target object 70 can be effectively processed by the application 60 associated with the wrapper 80.

There are a wide variety of algorithms that may be used by a means tester 85 to calculate the likelihood score. The particular algorithm used will depend on which user application 60 the means tester 85 and application wrapper 80 is associated with. As an example, a phone dialer application would first determine whether the target object 70 is of a suitable object type. If the target object 70 is of a type which is not either a number or a string, the likelihood score would be very low or zero. If the target object 70 is of a number or string type, then the means tester 85 will proceed with a series of pattern matching exercises to determine the appropriate likelihood score value. If, for instance, the target object 70 pattern is a seven digit integer number, the likelihood score would be very high, at or approaching a maximum score, such as one. If the target object 70 pattern is a string of length eight, which includes seven number and one dash, then the likelihood score would likewise be very high. If, however, the target object 70 pattern is a seven digit non-integer number, then the likelihood score would be some intermediate value, such as 0.15. As would be understood by one of ordinary skill in the art, phone numbers can be represented in a variety of ways, particularly when the phone numbers are for international locations. The purpose of the pattern matching is to identify the likelihood that the target object 70 is one of those representations. The more likely, the higher the resulting likelihood score.

As with the phone dialer means tester 85, means testers 85 for other user applications 60 would be application, or at least application-type, specific. The particular algorithms within such means testers 85 would be tailored to identify the likelihood that the target object 70 could be handled by the application 60 associated with each such means tester 85. The programming of the particular tests employed for each means tester 85 would be within the skill of one of ordinary skill in the art.

The likelihood score produced by the means tester 85 is passed back from the application wrapper 80 to the object mapper 120, where it is temporarily stored and compared with the likelihood score scores received from other registered application wrappers 80 that have been queried. Once all application wrappers 80 listed in the application wrapper registration vector 125 have been queried by the object mapper 120, the object mapper 120 utilizes an arbitration algorithm to determine which application 60 should be identified as the recruited application 68. One such arbitration algorithm would be a highest-score-wins type arbitration algorithm. Additional examples of practical arbitration algorithms include, selecting the highest likelihood score which is above a certain threshold, or prompting the user to choose an application 60 in the event of tied likelihood scores. It should be noted that it is possible that no likelihood score is high enough to indicate that any other application 60 can suitably handle the target object 70; in such a situation, the dynamic object linking may fail.

The selection of an application 60 via an arbitration algorithm identifies a recruited application 68. The object mapper 120 causes the recruited application 68 to be activated and to receive a copy of the target object 70. Preferably, the object mapper 120 instructs the application wrapper 80 to activate its associated main application program 83, i.e. the recruited application's 68 main application program 83, and to pass it a copy of the target object 70. The application wrapper 80 may first check to see if its associated main application program 83 is already activated before spawning another. The recruited application 68 then processes, and possibly modifies, the copy of the target object 70.

For example, assume the recruited application 68 identified by the object mapper 120 were a phone dialing application, and the target object 70 were a seven digit text string which could be interpreted to be a phone number, as previously discussed. Upon activation, the phone dialing application would receive the seven digit phone number and attempt to dial and establish contact with the party having that phone number.

The recruited application 68 is also permitted to alter or modify the copy of the target object 70. To illustrate this point, consider another possible scenario, whereby the phone dialer application upon receipt of the seven digit text string object, scans a client contact database which contains information regarding business clients and their associated phone numbers. A scan of the database reveals that the client associated with the target object 70 phone number string has recently acquired a new phone number. Upon making this determination, the phone dialer application attempts to dial the new phone number and establish contact with the associated client. The phone dialer then also modifies the target object 70 so as to reflect the change in phone numbers.

When the selected application has completed its task, the potentially modified copy of the target object 70 is passed to the dynamic linking control 110. For ease of reference, this potentially modified copy of the target object 70 is called the return object 75. The dynamic linking control 110 then passes the return object 75 to the host active application, where the return object 75 supplants the target object 70.

The discussion above has assumed that the means tester 85 is included in the application wrapper 80. However, it should be noted that the means tester 85 could exist external to the application wrapper 80. If so, no applications wrapper 80 is required to be present for the present dynamic object linking interface to operate. Instead, the object mapper 120 could both directly query the means testers 85 and launch the recruited application 68. However, the preferred embodiment includes applications wrappers 80.

It also should be noted that not all applications 60 will be registered with the object mapper 120. If an application 60 is not registered, then dynamic object linking to that application 60 is not available.

The structure of this dynamic object linking interface strategy is very powerful and quite flexible, as it is capable of functioning with any arbitrary object and does not expect or require a pre-determined link between an object and an application. The structure of the dynamic object linking interface also allows for third party application developers to provide their own algorithms for assessing the probability that their application can manipulate an object, thus systems exhibiting highly complex reasoning capability can be supported.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A process for dynamically linking a target object from a host application with another user application in a computer system having a plurality of user applications, comprising:

a) computing likelihood scores for a plurality of user applications, each likelihood score indicating the suitability of a corresponding user application for processing the target object;

b) identifying a recruited application based on said likelihood scores; and c) passing said target object to said recruited application.

2. The process of claim 1 further comprising starting an instance of said recruited application.

3. The process of claim 1 further comprising modifying the target object by said recruited application to create a return object.

4. The process of claim 3 further comprising thereafter passing said return object to the host application.

5. The process of claim 1 wherein said identifying of a recruited application includes comparing a plurality of said likelihood scores to identify the highest of said likelihood scores.

6. The process of claim 1 wherein identifying a recruited application comprises identifying a plurality of candidate applications, prompting a user to select one of said candidate applications, and selecting one of said candidate applications as the recruited application based upon said user input.

7. A process for dynamically linking a target object from a host application with another user application in a computer system having a plurality of user applications, comprising:
   a) acquiring a copy of the target object by an object mapper;
   b) passing a copy of the target object from said object mapper to a plurality of means testers, each associated with a corresponding user application;
   c) computing, by said means testers, of a plurality of likelihood scores, each likelihood score indicating the suitability of a corresponding user application for processing the target object;
   d) identifying a recruited application based on said likelihood scores; and
   e) passing a copy of the target object to the recruited application.

8. The process of claim 7 further including:
   a) generating, by the recruited application, a return object based on the target object; and
   b) passing said return object to the host application.

9. The process of claim 7 wherein said identifying of a recruited application includes comparing a plurality of said likelihood scores to identify the highest of said likelihood scores.

10. The process of claim 7 wherein identifying a recruited application comprises identifying a plurality of candidate applications, prompting a user to select one of said candidate applications, and selecting one of said candidate applications as the recruited application based upon said user input.

11. An object-linking interface implemented by a computer system having a plurality of user applications for dynamically linking a target object in a host application with a recruited application available on said computer, comprising:
   a) one or more means testers, each of which is associated with a corresponding user application, for testing the target object and generating a likelihood score indicative of the associated user application's suitability for processing the target object; and
   b) an object mapper for querying said means testers, identifying a recruited application based upon said likelihood scores, and passing said target object to said recruited application.

12. The object linking interface according to claim 11 wherein said object mapper passes said target object to said means testers.

13. The object linking interface according to claim 12 further comprising a dynamic linking control actuated by a user for initiating the object mapper.

14. The object linking interface according to claim 13 wherein the dynamic linking control acquires said target object from the host application and passes said target object to said object mapper.

15. An object-linking interface implemented by a computer for dynamically linking a target object with a recruited application available on said computer, comprising:
   a) a dynamic linking control actuated by a user for acquiring a copy of the target object;
   b) an object mapper for receiving the target object from the dynamic linking control and recruiting a recruited application to process said target object;
   c) one or more application wrappers, each of which is associated with a corresponding user application, to receive the target object from the object mapper, said application wrappers including a means tester for testing the target object and generating a likelihood score indicative of the associated user application's suitability for processing the target object; and
   d) wherein said object mapper is operative to query each said means tester to obtain said likelihood scores, to identify a recruited application for processing said target object, and passing the target object to said recruited application.

16. The object linking interface of claim 15 wherein the application wrapper controls the configuration, launching, and termination of the associated application.

* * * * *